US 8,661,067 B2

(12) United States Patent
Lehr et al.

(10) Patent No.: US 8,661,067 B2
(45) Date of Patent: Feb. 25, 2014

(54) PREDICTIVE MIGRATE AND RECALL

(75) Inventors: Douglas L. Lehr, Tucson, AZ (US);
Franklin E. McCune, Tucson, AZ (US);
David C. Reed, Tucson, AZ (US); **Max
D. Smith**, Tucson, AZ (US)

(73) Assignee: **International Business Machines
Corporation**, Armonk, NY (US)

( * ) Notice: Subject to any disclaimer, the term of this patent is extended or adjusted under 35 U.S.C. 154(b) by 295 days.

(21) Appl. No.: 12/903,947

(22) Filed: Oct. 13, 2010

(65) Prior Publication Data

US 2012/0096053 A1 Apr. 19, 2012

(51) Int. Cl.
*G06F 17/30* (2006.01)

(52) U.S. Cl.
USPC ........... 707/809; 707/740; 707/776; 707/791; 707/802; 707/803; 707/810; 707/811; 707/812; 711/137

(58) Field of Classification Search
USPC ................. 707/740, 776, 791–803, 809–812, 707/999.101–102; 711/137
See application file for complete search history.

(56) References Cited

U.S. PATENT DOCUMENTS

| 6,012,052 | A  | * | 1/2000  | Altschuler et al. ................... 1/1 |
| 6,195,622 | B1 | * | 2/2001  | Altschuler et al. ................. 703/2 |
| 6,553,476 | B1 |   | 4/2003  | Ayaki et al. |
| 6,631,496 | B1 | * | 10/2003 | Li et al. ........... 715/200 |
| 6,766,422 | B2 | * | 7/2004  | Beyda ............ 711/137 |
| 6,839,680 | B1 | * | 1/2005  | Liu et al. ...................... 705/7.33 |
| 2003/0061451 | A1 | * | 3/2003  | Beyda ............ 711/137 |
| 2003/0115410 | A1 | * | 6/2003  | Shriver .......... 711/113 |
| 2004/0064640 | A1 | * | 4/2004  | Dandrea et al. ............... 711/114 |
| 2004/0163029 | A1 | * | 8/2004  | Foley et al. ............. 714/769 |
| 2004/0220779 | A1 | * | 11/2004 | Fukao .......... 702/188 |
| 2004/0250169 | A1 | * | 12/2004 | Takemori et al. ............... 714/38 |
| 2006/0064411 | A1 | * | 3/2006  | Gross et al. ................... 707/3 |
| 2006/0085788 | A1 | * | 4/2006  | Amir et al. .................... 718/100 |
| 2006/0200556 | A1 | * | 9/2006  | Brave et al. .................. 709/224 |
| 2006/0269050 | A1 | * | 11/2006 | Yezhuvath et al. ....... 379/114.01 |
| 2007/0005905 | A1 |   | 1/2007  | Yasue et al. |
| 2007/0033340 | A1 | * | 2/2007  | Tulskie et al. ................ 711/108 |
| 2007/0245420 | A1 | * | 10/2007 | Yong et al. .................... 726/23 |
| 2008/0040314 | A1 | * | 2/2008  | Brave et al. ....................... 707/2 |
| 2008/0243590 | A1 | * | 10/2008 | Rich ............................. 705/10 |
| 2009/0177507 | A1 | * | 7/2009  | Breitgand et al. ................ 705/7 |
| 2010/0095215 | A1 | * | 4/2010  | Elven ........................... 715/736 |
| 2011/0035409 | A1 | * | 2/2011  | Shimada et al. .............. 707/783 |
| 2011/0161492 | A1 | * | 6/2011  | Granville ..................... 709/224 |
| 2011/0264663 | A1 | * | 10/2011 | Verkasalo ..................... 707/740 |
| 2012/0084282 | A1 | * | 4/2012  | Chiang et al. ................. 707/725 |

* cited by examiner

Primary Examiner — Syling Yen
(74) Attorney, Agent, or Firm — Griffiths & Seaton PLLC

(57) ABSTRACT

Various embodiments for optimizing data migration and recall in a computing storage environment by a processor device are provided. Data stored in the computing storage environment is analyzed over a predetermined period of time to identify a usage pattern of a portion of the data. The portion of the data having the usage pattern is recalled in advance of a usage time, the usage time predicted by the usage pattern for the portion of the data to be accessed.

18 Claims, 5 Drawing Sheets

PREDICTIVE MIGRATE AND RECALL

BACKGROUND OF THE INVENTION

1. Field of the Invention

The present invention relates in general to computers, and more particularly to a method, system, and computer program product for optimizing storage migration and recall operations in a computing storage environment.

2. Description of the Related Art

The majority of businesses in the world today use computers and computer operating systems to store and manage information. Typically, such information is stored and managed in interconnected storage systems. Such systems may be complex, involving many interconnected storage devices, communication paths, and the like to store a vast amount of data in many forms. To help accommodate such data storage, space management products may migrate data from/to various storage mediums, such as from direct access storage devices (DASD) to tap devices or other storage devices (e.g., other DASD devices) when certain storage criteria are met. In one conventional application, an exemplary criterion is a number of days since the data was last accessed.

As applications and users attempt to access data subject to these migration operations, the data must be recalled. Because the data often changes form between storage devices, this can take several minutes of time depending on the level of activity and volume of data to be recalled. In addition, some users may only use certain data sets at specific times of the month or every time they sign onto the system.

SUMMARY OF THE INVENTION

If data to be recalled may be recalled ahead of time, the data latency would be greatly reduced, and users and applications would benefit from significant time savings. Accordingly, a need exists for a mechanism whereby data subject to such migration and other storage operations (e.g., where the data changes form but at a subsequent time must be recalled) whereby such data may be recalled in advance of a time in which it was needed.

In view of the foregoing, various embodiments for optimizing data migration and recall in a computing storage environment by a processor device are provided. In one embodiment, by way of example only, data stored in the computing storage environment is analyzed over a predetermined period of time to identify a usage pattern of a portion of the data. The portion of the data having the usage pattern is recalled in advance of a usage time, the usage time predicted by the usage pattern for the portion of the data to be accessed.

Additional system and computer program product embodiments are provided and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for optimizing data migration and storage recall operations as previously described. These embodiments feature predictive analysis based on historic data usage to determine when portions of data (such as a data set) is likely to be used. Once such a determination is made, the data is recalled in advance of the job or activity that normally takes place (e.g., an hour in advance). For batch jobs that execute near the same time on a weekly basis, this can save a significant amount of time and improve overall system throughput as well as reduced batch windows. If the data is not accessed after that batch window for another week, then the data set would then be set to be migrated again as soon as the next space management window executes.

Figure 1:
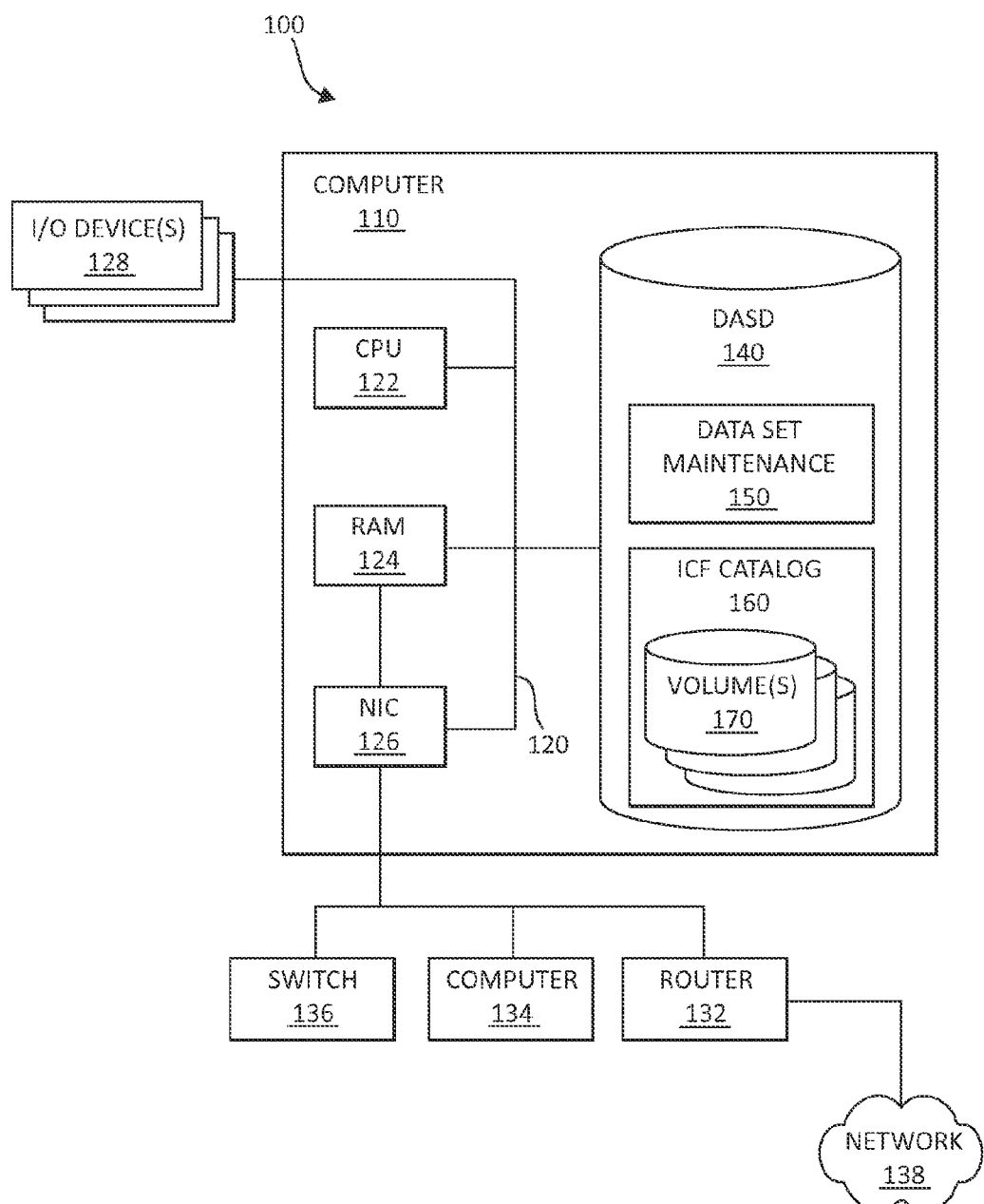
FIG. 1 is an exemplary computing environment.

FIG. 1 depicts one embodiment of a computer system for optimizing data migration and recall operations in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
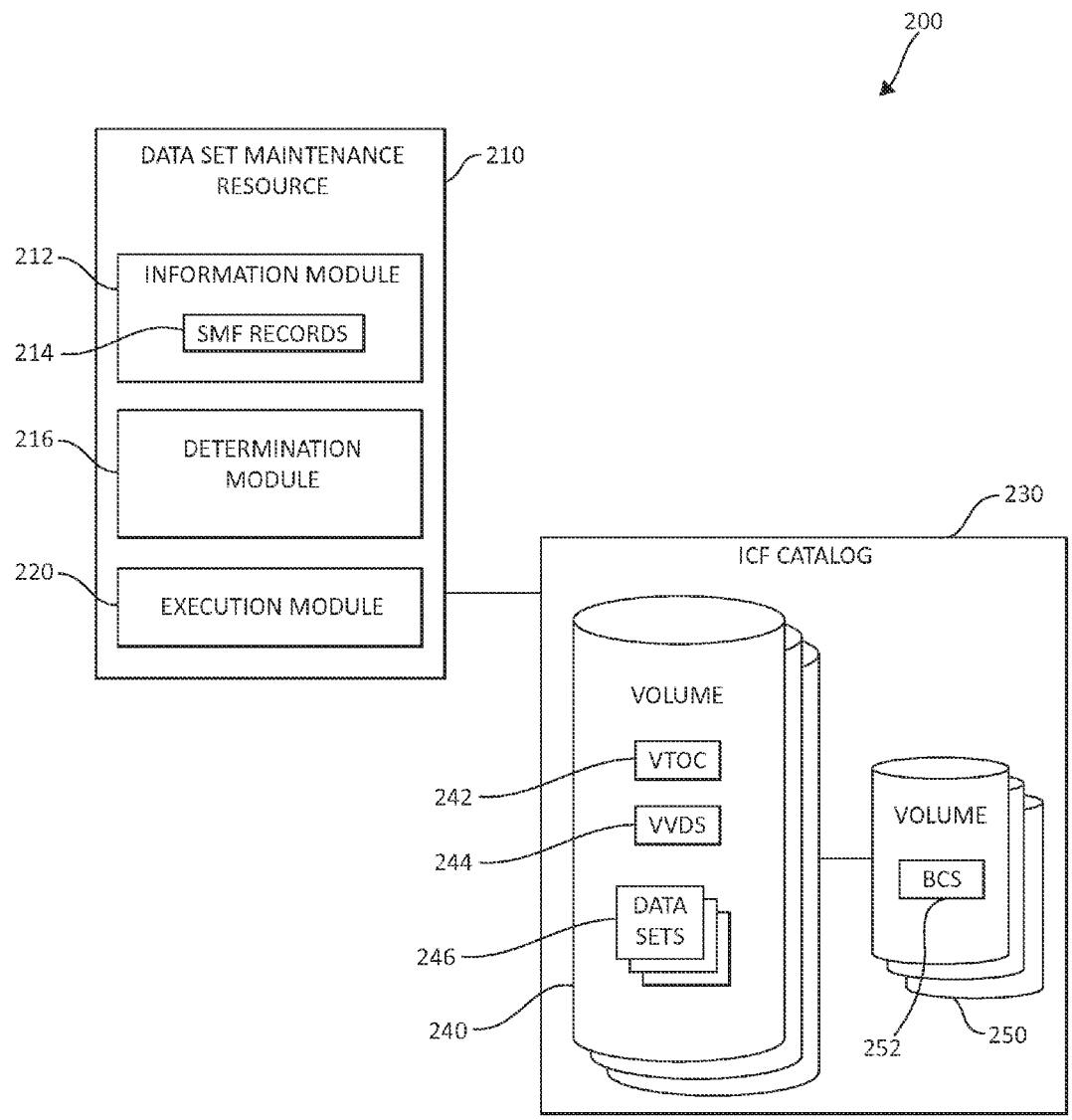
FIG. 2 is an exemplary data set maintenance resource.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, system management facility (SMF) records 214, a determination module 216, and an execution module 220. ICF catalog 230 includes a volume 240, a volume table of contents (VTOC) 242, a VSAM volume data set (VVDS) 244, data sets 246, diagnostic data set components 248 associated with the data sets 246, a volume 250, and a basic catalog structure (BCS) 252.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents. The relationship between the BCS 252, VVDS 244, and VTOC 242 is not exclusive.

In the depicted embodiment, the data set maintenance resource 210 includes the information module 212, the determination module 216, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job. The data set maintenance resource 210, in one embodiment, facilitates the analysis and scheduling of data according to aspects of the present invention, as will be further illustrated.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed. Other information retrieved by the information module may include a data set name, catalog status, the type entry in the catalog such as the type of data set or the VSAM index of a VSAM data set, or associated data set names if applicable.

The information module 212 includes SMF records 214 in a data repository for tracking such actions as opening a file, closing a file, and catalog updates of VSAM data sets. The information module 212 may examine SMF records 214 as will be further described to analyze usage patterns in the data over a predetermined period of time. Other information retrieved by the information module may include a data set name, catalog status, the type entry in the catalog such as the type of data set or the VSAM index of a VSAM data set, or associated data set names if applicable.

In the depicted embodiment, the determination module 214 determines one or more data set operations to perform. The determination module 214 may examine VTOC and/or VVDS information, including data set-specific diagnostic information to determine one or more operations to perform, such as operations pursuant to allocating a data set to a particular job or storage resource as one of ordinary skill in the art will appreciate.

The execution module 220 executes the one or more generated control statements to perform various operations on the data sets 246. The execution module may be adapted to execute scheduling operations pursuant to a usage schedule, as will be further described.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140.

As previously mentioned, the information module 212 is adapted to examine SMF records 214 as will be further described to analyze usage patterns in the data over a predetermined period of time. In one embodiment, SMF records 214 are examined to determine when particular data sets are opened and closed. As previously mentioned, storage environments use space management applications to facilitate data migration and additional storage operations. With this in mind, for example, if a particular space management routine migrates data sets that have not been accessed in 3 days, the mechanisms of the illustrated embodiments may scan through the SMF records 214 or migration logs to determine what data sets would have been moved by the space management. The mechanisms of the illustrated embodiments may then scan through the open SMF records 214 or recall logs to see when those data sets where moved back to primary space due to an access.

As a next step, the mechanisms of the illustrated embodiments may identify patterns in this data to determine if recall activity takes place for certain data sets at certain times of the week or month, for example. For those data set that do have patterns, a preemptive recall list with a time and date schedule may be created. This schedule is then used to recall data sets before they are needed. The SMF records 214 may then be used to verify that the data set was accessed after the preemptive recall to validate the recall. Pursuant to this validation process, in one embodiment, if the data set was not accessed at the expected time, it is removed from the pre-emptive recall list. If subsequent analysis shows that a pattern again exists for the data set, it may be re-added later. This same methodology can be used to do immediate migration of data sets if historical information shows that they will no longer be needed until the next run of batch and thus improve DASD usage.

In regards to data associated with individual users, a check may be performed for data set usage and user logon activity. A list of all data sets may be compiled that indicates which data sets were accessed by the user within 24 hours of logging on to his or her ID. This data may then be analyzed over several logon periods to establish a pattern of data set usage. A similar operation may then be performed where those data sets are added to a user logon preemptive recall list. In one embodiment, for example, when the user signs on, an exit is driven and a catalog locate is performed on all data sets the user generally uses within 24 hours of logon. For those data sets that are currently migrated, a recall is issued before the user tries to access them. An additional usage check may then be performed after a 24 hour period, and those data sets not accessed may then be removed from the recall list. An example of the type of data set that may fit into this category could be a user's set of JCL jobs, execs, or even analysis tools such as a user's dump directory.

Carrying forward the example just described, additional functionality may be provided such that data may be specified not to be removed if the data has not been used within a certain number of logons (e.g., 1-5), and accordingly the data is not removed until the non-usage exceeds this setting. This functionality may also be applied to the application-level preemptive recall list previously described. The user may specify if a particular data set is to be removed after one non-usage occurrence or up to 5 non-usage occurrences, for example.

Figure 3:
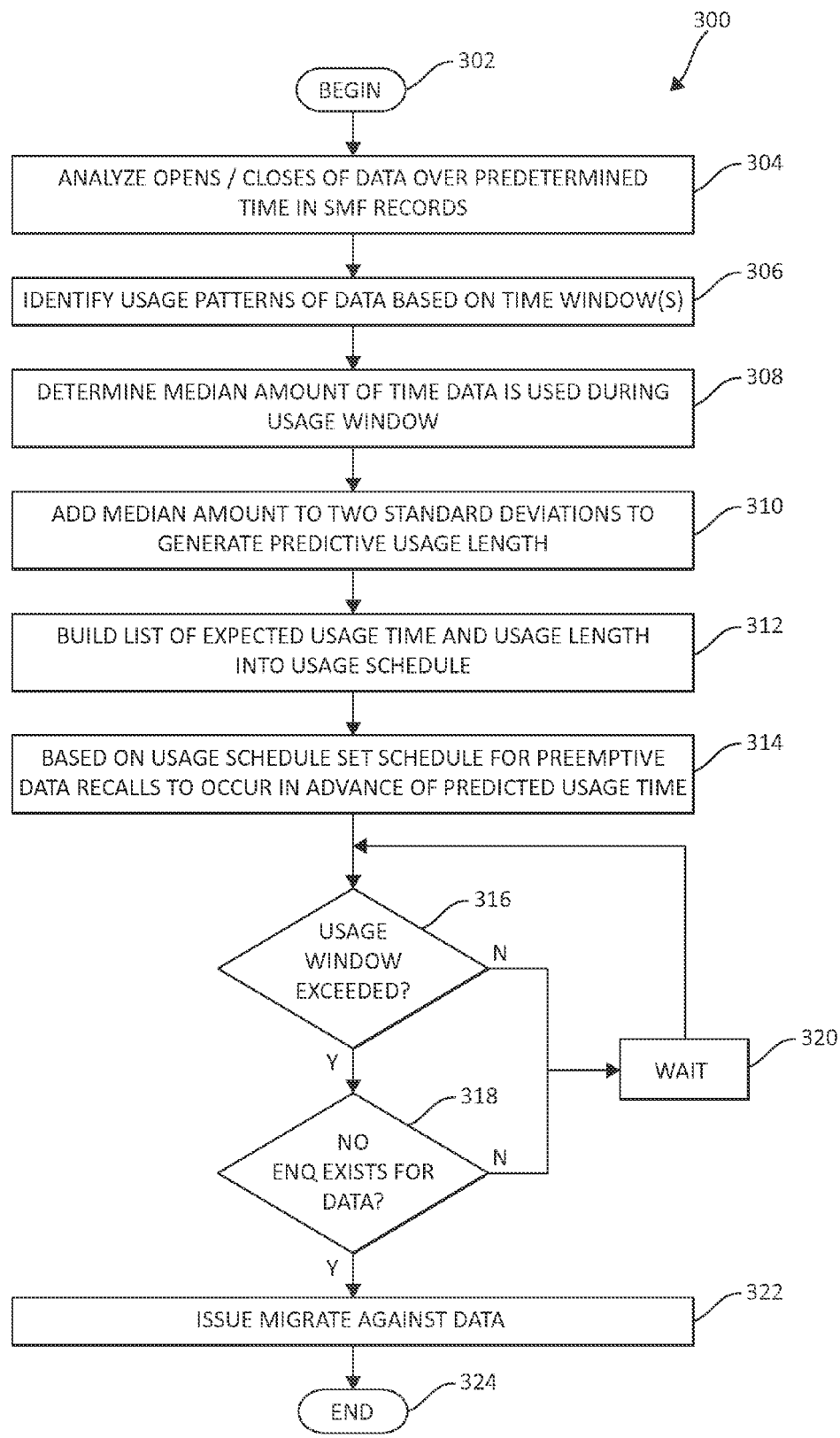
FIG. 3 is an exemplary method for optimizing data migration and recall in a computing storage environment in which various aspects of the illustrated embodiments and following claimed subject matter may be implemented.

Turning now to FIG. 3, a logic flow diagram of an exemplary method 300 for optimizing data migration and recall operations in a computing storage environment is depicted. As one skilled in the art will appreciate, the described method may be implemented by various means, such as hardware, software, firmware, or a combination thereof operational on or otherwise associated with the computing storage environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 300 may be carried out by various components of the data set maintenance resource 210 (FIG. 2), as previously described, such as by various data set modules.

Method 300 begins (step 302) by analyzing the aforementioned SMF records for opens and closes of data sets for a predetermined period of time (step 304). In one exemplary embodiment, this predetermined time is approximately three months. As one of ordinary skill in the art will appreciate, however, the predetermined time may vary according to a particular implementation. Subsequent to the monitoring of data set SMF records as previously described, those data sets having been unused for several consecutive days are identified. This identification is an exemplary illustration of, generically stated, identifying usage patterns of data based on time window(s) (step 306). Returning to the present example, from those data sets that have unused periods, a determination is made if the same days of the week are unused each week. In addition, the unused periods are examined to determine if the same days of the month are unused. Ultimately this analysis goes to determine those data sets that are only used during a time window that occurs at a certain period of time (such as day of the week or day of the month, for example). In addition, this same methodology may be used to analyze the data over the period of a year for those data sets that have annual activity at specific dates of the year. Again, such analysis is exemplary, and one of ordinary skill will appreciate that the identification of usage patterns of data based on varying time windows will depend on a variety of factors (including user preferences), and may be configured in a variety of implementations.

As a following step, the median amount of time the data is sued during a usage window is determined (step 308). In the present embodiment, this median amount is added to two standard deviations of time to calculate a predictive usage length (step 310). Again, the calculation of the median amount of time may vary as an average, a mode, and other statistical calculations as one of ordinary skill in the art will appreciate, as will the addition of statistically related information such as two standard deviations of time to the median to calculate the predictive usage length.

Based on the predictive usage length and the expected usage time, a usage schedule is constructed (step 312). In one embodiment, this usage schedule may be customized for data meeting various criteria such as weekly, monthly, or annual usage criteria. The usage schedule is then used to set a schedule for preemptive data recalls (step 314), which, in one embodiment, are scheduled to occur approximately one hour before the time when the data set is expected to be accessed. Here again, the approximately one hour of predetermined advance recall time may be varied according to user preference, or according to a particular implementation for a variety of reasons one of ordinary skill in the art will appreciate.

After the usage window is exceeded (step 316), the method 300 checks to determine that no enqueues (ENQs) exist for the particular data set (in other words, the data is no longer being used) (step 318). If the usage window is not exceeded or ENQs are found for the data set, the system waits (step 300) until this is not the case. Once steps 316 and 318 are satisfied, the method 3000 issues a migrate against the data set to perform the migration functionality pursuant to the storage management scheme in use (step 322). The method 300 then ends (step 324).

Figure 4:
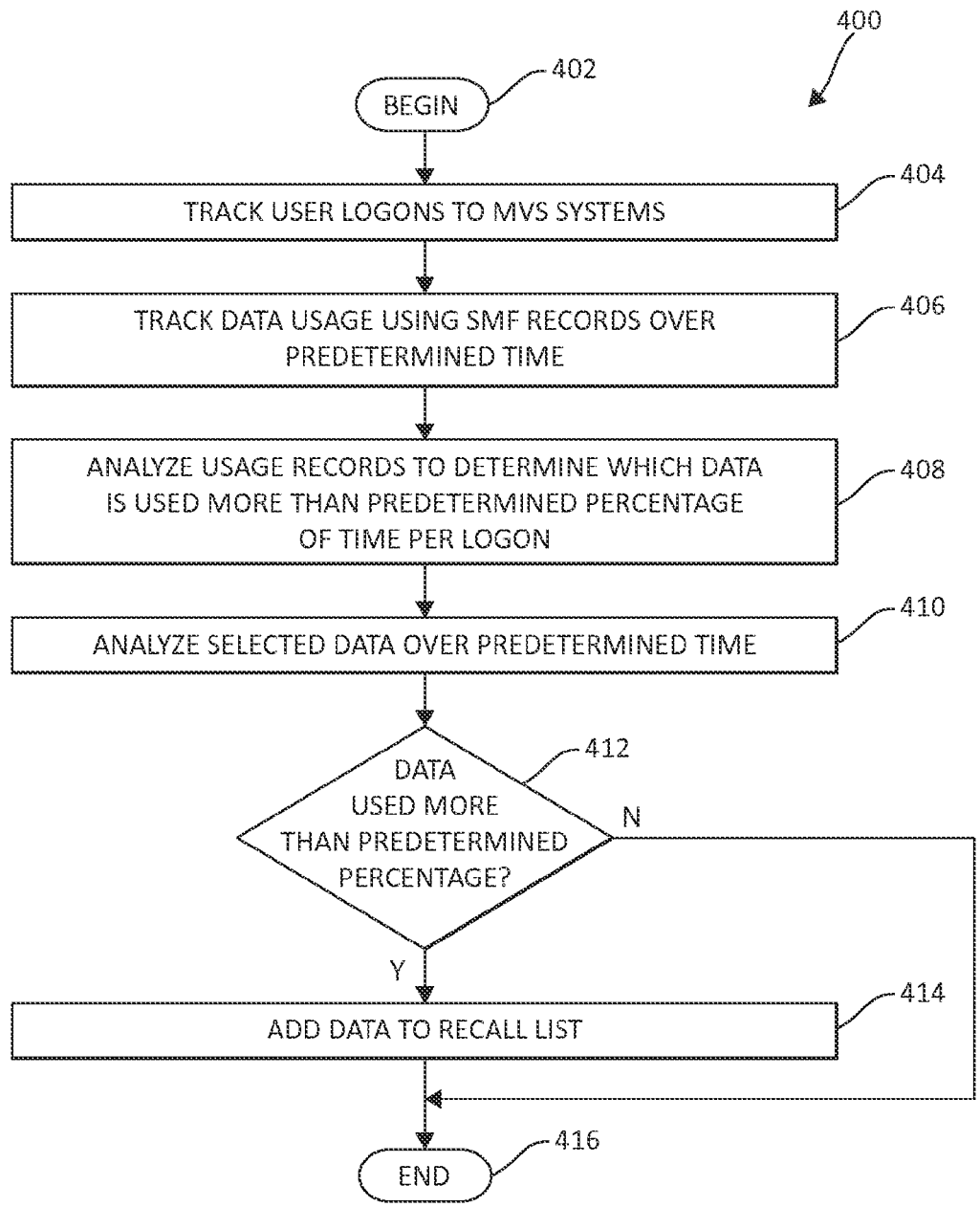
FIG. 4 is an additional exemplary method for optimizing data migration and recall in a computing storage environment, again in which various aspects of the illustrated embodiments and following claimed subject matter may be implemented.

FIG. 4, following, is a logic flow diagram illustrating an additional exemplary method 400 for optimizing individual user data set migration and recall in view of the mechanisms of the illustrated embodiments, and further in view of the functionality described previously in FIG. 3. Method 400 begins (step 402) by tracing user logons to MVS systems (step 404). The individual user data set usage is tracked (by user) using the same SMF records as previously described (step 406). Usage records are then analyzed to determined which data is used more than a predetermined percentage of time per logon (step 408). In one exemplary embodiment, this predetermined percentage is approximately 50 percent, while again the predetermined percentage may vary according to a particular implementation.

As a next step, the selected data is analyzed over a predetermined time (step 410). In one exemplary embodiment, this predetermined time is approximately one month, yet again may vary. During the course of this analysis, if the data sets are used more than the predetermined percentage (step 412), they are added to the automatic recall list (step 414). The method 400 then ends (step 416).

Figure 5:
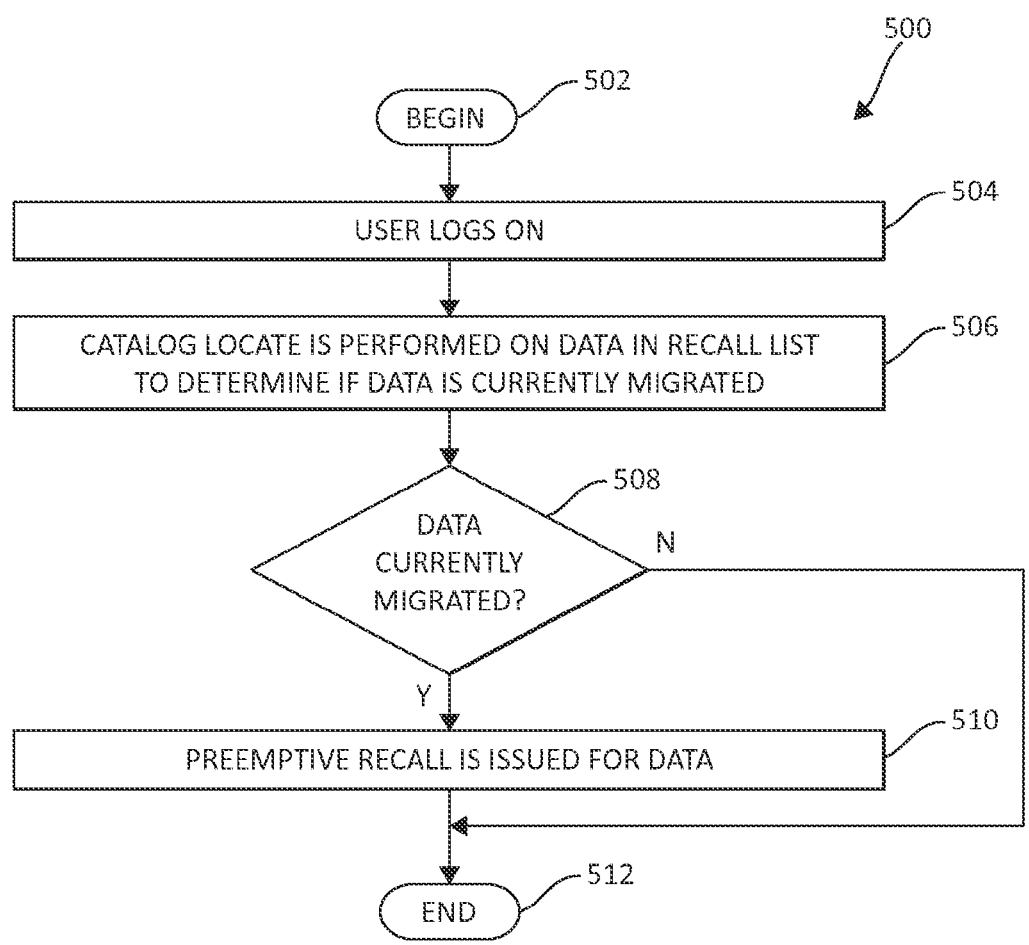
FIG. 5 is an additional exemplary method for optimizing data migration and recall in a computing storage environment, again in which various aspects of the illustrated embodiments and following claimed subject matter may be implemented.

As previously mentioned, in one embodiment, the mechanisms of the present invention may be tuned such that any time a user logs on, those data sets that are shown in the automatic recall list will have a catalog locate performed to determined if they are currently migrated. Turning now to FIG. 5, a flow chart diagram of an additional embodiment of an exemplary method for optimizing data migration and recall operations in a computing storage environment is illustrated, specifically directed towards the catalog locate functionality previously described. Method 500 begins (step 502) with a user logon (step 504). As a following step, the catalog locate is performed on those data sets shown in the automatic recall list to determine if the data is currently migrated (step 506). If the data is currently migrated (step 508), a preemptive recall is issued (step 510). The method 500 then ends (step 512).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for optimizing data migration and recall in a computing storage environment, by a processor device, comprising:

analyzing data stored in the computing storage environment over a predetermined period of time;

identifying a usage pattern of a portion of the data during a time window within the predetermined period of time;

calculating a median length of time the portion of the data is used during the time window;

adding the median length of time to an additional time calculated from the median length of time to generate a predictive usage length;

placing the portion of the data having the usage pattern on a preemptive recall list;

preemptively recalling the portion of the data having the usage pattern from the preemptive recall list in advance of a usage time, the usage time predicted by the usage pattern for the portion of the data to be accessed;

after preemptively recalling, determining whether the portion of the data has not been accessed during the time window within the predetermined period of time; and removing the portion of the data from the preemptive recall list, in determining the portion of the data was not accessed during the time window within the predetermined period of time.

2. The method of claim 1, wherein the analyzing the data further includes identifying portions of the data having been unused for an additional predetermined period of time.

3. The method of claim 1, further including building a usage schedule from the usage length and the usage time, wherein the preemptive recall of the portion of the data is set based on the usage schedule.

4. The method of claim 1, wherein the analyzing the data further includes parsing through at least one of system management facility (SMF) records and migration logs.

5. The method of claim 1, wherein the analyzing the data further includes performing at least one of monitoring user logons to multiple virtual storage (MVS) systems and parsing through system management facility (SMF) records.

6. The method of claim 5, wherein the usage pattern of the portion of the data is calculated by determining if the portion is used more than a predetermined percentage per user logon over the predetermined period of time.

7. A system for optimizing data migration and recall in a computing storage environment, comprising:

a processor device; and a data set module operational with the processor device, wherein the data set module is adapted for:

analyzing data stored in the computing storage environment over a predetermined period of time;

identifying a usage pattern of a portion of the data during a time window within the predetermined period of time;

calculating a median length of time the portion of the data is used during the time window;

adding the median length of time to an additional time calculated from the median length of time to generate a predictive usage length;

placing the portion of the data having the usage pattern on a preemptive recall list;

preemptively recalling the portion of the data having the usage pattern from the preemptive recall list in advance of a usage time, the usage time predicted by the usage pattern for the portion of the data to be accessed;

after preemptively recalling, determining whether the portion of the data has not been accessed during the time window within the predetermined period of time; and removing the portion of the data from the preemptive recall list, in determining the portion of the data was not accessed during the time window within the predetermined period of time.

8. The system of claim 7, wherein the data set module is further adapted for, pursuant to analyzing the data, identifying portions of the data having been unused for an additional predetermined period of time.

9. The system of claim 8, wherein the data set module is further adapted for building a usage schedule from the usage length and the usage time, wherein the preemptive recall of the portion of the data is set based on the usage schedule.

10. The system of claim 7, wherein the data set module is further adapted for, pursuant to analyzing the data, parsing through at least one of system management facility (SMF) records and migration logs.

11. The system of claim 7, wherein the data set module is further adapted for, pursuant to analyzing the data, performing at least one of monitoring user logons to multiple virtual storage (MVS) systems and parsing through system management facility (SMF) records.

12. The system of claim 11, wherein the usage pattern of the portion of the data is calculated by determining if the portion is used more than a predetermined percentage per user logon over the predetermined period of time.

13. A computer program product for optimizing data migration and recall in a computing storage environment, the computer program product comprising a non-transitory computer-readable storage medium having computer-readable program code portions stored therein, the computer-readable program code portions comprising:

a first executable portion for analyzing data stored in the computing storage environment over a predetermined period of time;

a second executable portion for identifying a usage pattern of a portion of the data during a time window within the predetermined period of time;

a third executable portion for calculating a median length of time the portion of the data is used during the time window;

a fourth executable portion for adding the median length of time to an additional time calculated from the median length of time to generate a predictive usage length;

a fifth executable portion for placing the portion of the data having the usage pattern on a preemptive recall list;

a sixth executable portion for preemptively recalling the portion of the data having the usage pattern from the preemptive recall list in advance of a usage time, the usage time predicted by the usage pattern for the portion of the data to be accessed;

a seventh executable portion for, after preemptively recalling, determining whether the portion of the data has not been accessed during the time window within the predetermined period of time; and an eighth executable portion for removing the portion of the data from the preemptive recall list, in determining the portion of the data was not accessed during the time window within the predetermined period of time.

14. The computer program product of claim 13, further including a seventh executable portion for, pursuant to the analyzing the data, identifying portions of the data having been unused for an additional predetermined period of time.

15. The computer program product of claim 13, further including a seventh executable portion for building a usage schedule from the usage length and the usage time, wherein the preemptive recall of the portion of the data is set based on the usage schedule.

16. The computer program product of claim 13, further including a seventh executable portion for, pursuant to the analyzing the data, parsing through at least one of system management facility (SMF) records and migration logs.

17. The computer program product of claim 13, further including a seventh executable portion for, pursuant to the analyzing the data, performing at least one of monitoring user logons to multiple virtual storage (MVS) systems and parsing through system management facility (SMF) records.

18. The computer program product of claim 17, wherein the usage pattern of the portion of the data is calculated by determining if the portion is used more than a predetermined percentage per user logon over the predetermined period of time.

\* \* \* \* \*